United States Patent
Morikawa et al.

(10) Patent No.: US 11,287,149 B2
(45) Date of Patent: Mar. 29, 2022

(54) HEAT EXCHANGE VENTILATOR

(71) Applicant: Mitsubishi Electric Corporation, Tokyo (JP)

(72) Inventors: Masaki Morikawa, Tokyo (JP); Kenta Okeya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 16/615,864

(22) PCT Filed: Jun. 8, 2017

(86) PCT No.: PCT/JP2017/021365
§ 371 (c)(1),
(2) Date: Nov. 22, 2019

(87) PCT Pub. No.: WO2018/225224
PCT Pub. Date: Dec. 13, 2018

(65) Prior Publication Data
US 2020/0149760 A1  May 14, 2020

(51) Int. Cl.
*F24F 7/08* (2006.01)
*F24F 12/00* (2006.01)
*F24F 13/30* (2006.01)

(52) U.S. Cl.
CPC .............. *F24F 7/08* (2013.01); *F24F 12/006* (2013.01); *F24F 13/30* (2013.01)

(58) Field of Classification Search
CPC . F24F 7/08; F24F 13/30; F24F 12/006; Y02B 30/56
See application file for complete search history.

(56) References Cited

U.S. PATENT DOCUMENTS

| | | | | |
|---|---|---|---|---|
| 4,377,201 A | * | 3/1983 | Kruse | F24F 12/006 165/76 |
| 4,596,285 A | * | 6/1986 | Dinulescu | F28F 3/083 165/166 |

(Continued)

FOREIGN PATENT DOCUMENTS

| CN | 104315601 A | 1/2015 |
|---|---|---|
| CN | 206094416 U | 4/2017 |

(Continued)

OTHER PUBLICATIONS

Extended European Search Report dated May 15, 2020, issued by the European Patent Office in corresponding European Application No. 17912437.5. (9 pages).

Office Action (Notice of Reasons for Refusal) dated May 19, 2020, by the Japan Patent Office in corresponding Japanese Patent Application No. 2019-523300 and English translation of the Office Action. (8 pages).

(Continued)

*Primary Examiner* — Jessica Yuen
(74) *Attorney, Agent, or Firm* — Buchanan Ingersoll & Rooney PC (57) ABSTRACT

A heat exchange ventilator includes an exterior casing, and a heat exchanger that includes a heat exchange element of quadrangular-prism shape and heat exchanger frames each of which is mounted to each of four corners of the heat exchange element. The heat exchange ventilator includes guide rails that are mounted inside the exterior casing and engage the heat exchanger frame to guide the heat exchanger. Each of the guide rails includes an end-face-facing part facing an end face of the heat exchanger frame, a side-facing part providing a clearance between a side of the heat exchanger frame and the side-facing part, a holding part projecting from the side-facing part toward the heat exchanger frame, and a seal member that is provided in the clearance and seals a gap between the heat exchanger frame and the guide rail.

13 Claims, 7 Drawing Sheets

(56) References Cited

U.S. PATENT DOCUMENTS

| | | | | |
|---|---|---|---|---|
| 7,094,308 B1* | 8/2006 | Gearhart | ............... | F16L 55/179 138/97 |
| 8,955,578 B2* | 2/2015 | Kwon | ....................... | F28D 9/00 165/76 |
| 2009/0108476 A1* | 4/2009 | Eping | ............... | H01M 8/04126 261/83 |

FOREIGN PATENT DOCUMENTS

| | | |
|---|---|---|
| JP | H04052439 A | 2/1992 |
| JP | H10-300158 A | 11/1998 |
| JP | 2001263752 A | 9/2001 |
| JP | 2007285584 A | 11/2007 |
| JP | 2014-092293 A | 5/2014 |
| WO | 2018194087 A1 | 12/2016 |

OTHER PUBLICATIONS

Office Action dated Mar. 19, 2021, issued in Chinese Patent Application No. 201780091017.4, 13 pages including 6 pages of English translation.

Office Action dated Sep. 17, 2020, issued in corresponding Chinese Patent Application No. 201780091017.4, 13 pages including 6 pages of English translation.

International Search Report (PCT/ISA/210) dated Sep. 12, 2017, by the Japan Patent Office as the International Searching Authority for International Applicational No. PCT/JP2017/021365.

Written Opinion (PCT/ISA/237) dated Sep. 12, 2017, by the Japan Patent Office as the International Searching Authority for International Application No. PCT/JP2017/021365.

* cited by examiner

HEAT EXCHANGE VENTILATOR

FIELD

The present invention relates to a heat exchange ventilator that ventilates while performing heat exchange between a supply air flow and an exhaust air flow.

BACKGROUND

Among heat exchange ventilators, there is a ceiling-embedded type that is mounted in a roof space to supply and expel air through ducts. What is seen in many of ceiling-embedded heat exchange ventilators is that a heat exchanger of quadrangular-prism shape is installed in a middle of a hexahedral box to be removable by means of guide rails, lying down with its diagonal lines aligned with a vertical direction and a horizontal direction. Each of blowers is installed in two of four chambers that are separated by the heat exchanger in the box. For the ceiling-embedded heat exchange ventilator, the two blowers installed in the two chambers cause a supply air flow and an exhaust air flow to pass through the heat exchanger for heat exchange. A heat exchange ventilator of this type is disclosed in Patent Literature 1.

CITATION LIST

Patent Literature

Patent Literature 1: Japanese Patent Application Laid-open No. 2001-263752

SUMMARY

Technical Problems

The heat exchanger of the ceiling-embedded heat exchange ventilator can be removed by being slid on the guide rails. To cause the heat exchanger to slide, a contact part between the guide rail and the heat exchanger needs to be provided with space. When the contact part between the guide rail and the heat exchanger is provided with the space, space is provided between passages for the supply air flow and the exhaust air flow, thus causing air leaks. Joining of the supply air flow and the exhaust air flow not only impairs an air exchange function which is inherent in a ventilator, but also reduces air that is supposed to pass through the heat exchanger, thus causing a decreased heat exchange function.

To solve the above problem of air leaks, the contact part between the heat exchanger and the guide rail is sealed with a packing using an expanded foam material as a material, and the packing is sandwiched between the heat exchanger and the guide rail with the heat exchanger and the guide rail not directly abutting each other. Therefore, an amount by which the packing is compressed is largely dependent on accuracy of guide rail mounting position. To ensure stable sealing property while taking the accuracy of position into consideration, the amount of compression needs to be increased, thus increasing compressive force. The heat exchanger is attached or detached with the packing compressed, so that the packing has great opposing force caused by the compressive force, thus causing increased frictional resistance. Accordingly, the heat exchanger does not slide smoothly when attached or detached, and after repeatedly attaching and detaching the heat exchanger, the packing can have a crack or a break. When the packing has the crack or the break, the packing cannot keep its sealing performance.

Moreover, weight of the heat exchanger is applied to the packings, so that those packings that are compressed particularly by the application of the weight of the heat exchanger have a higher possibility of cracking or breaking.

The present invention has been made in view of the above, and an object of the present invention is to provide a heat exchange ventilator that reduces deterioration of sealing property between a heat exchanger and a guide rail that is caused due to detaching and attaching of the heat exchanger.

Solution to Problems

An aspect of the present invention is a heat exchange ventilator including an exterior casing including a supply air passage that lets a supply air flow through and an exhaust air passage that lets an exhaust air flow through, and a heat exchanger that is mounted between the supply air passage and the exhaust air passage to perform heat exchange between the supply air flow and the exhaust air flow and includes a heat exchange element of quadrangular-prism shape and heat exchanger frames each of which is mounted to each of four corners of the heat exchange element. This heat exchange ventilator includes a plurality of guide rails that are mounted inside the exterior casing and engage the heat exchanger frames to guide the heat exchanger that is detached from and attached to the exterior casing. Each of the guide rails includes an end-face-facing part facing an end face of corresponding one of the heat exchanger frames, a side-facing part providing a clearance between a side of the heat exchanger frame and the side-facing part, a holding part projecting from the side-facing part toward the heat exchanger frame, and a seal member that is provided in the clearance and seals a gap between the heat exchanger frame and the guide rail.

Advantageous Effect of Invention

The heat exchange ventilator according to the present invention is capable of suppressing diminution of sealing property between the heat exchanger and the guide rail when the heat exchanger is detached and attached.

DESCRIPTION OF EMBODIMENTS

With reference to the drawings, a detailed description is hereinafter provided of heat exchange ventilators according to embodiments of the present invention. It is to be noted that the embodiments are not restrictive of this invention.

First Embodiment

Figure 1:
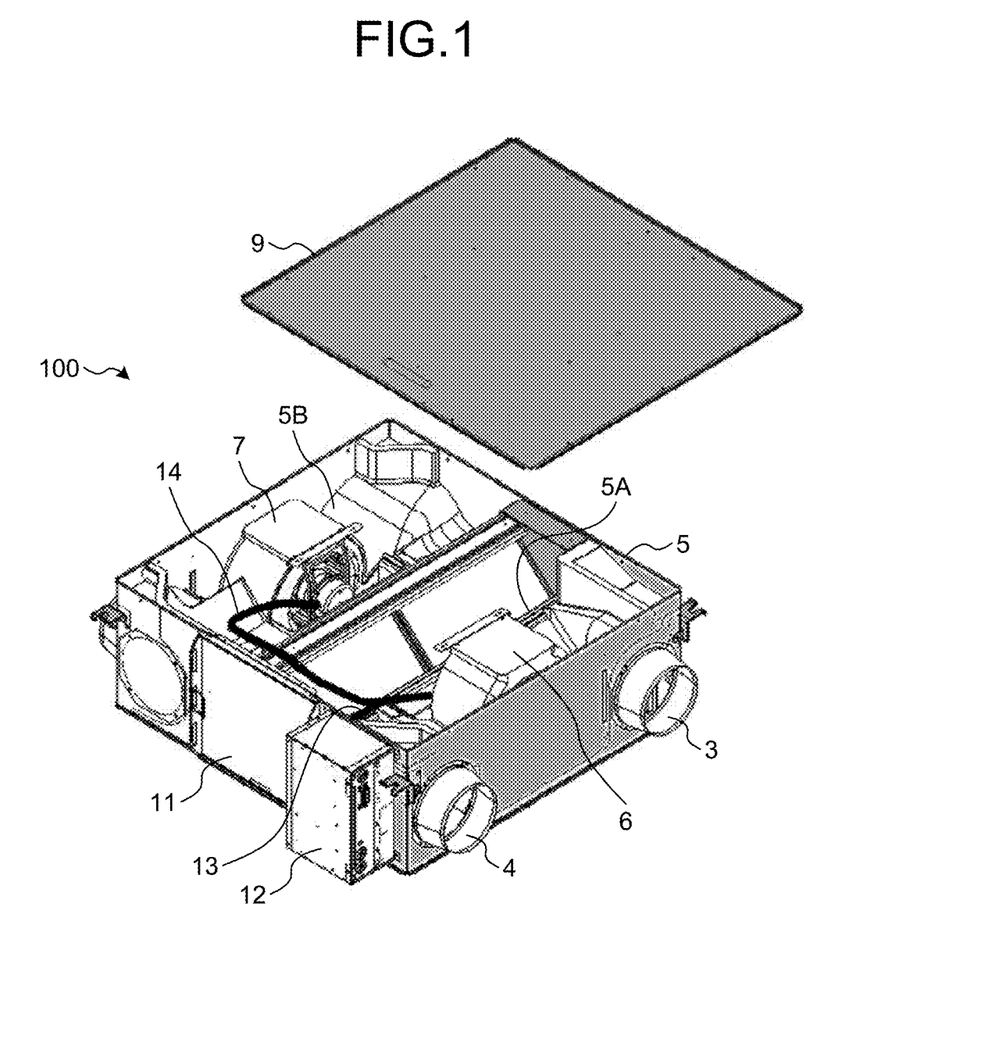
FIG. 1 is an exploded perspective view of a heat exchange ventilator according to a first embodiment of the present invention.
Figure 2:
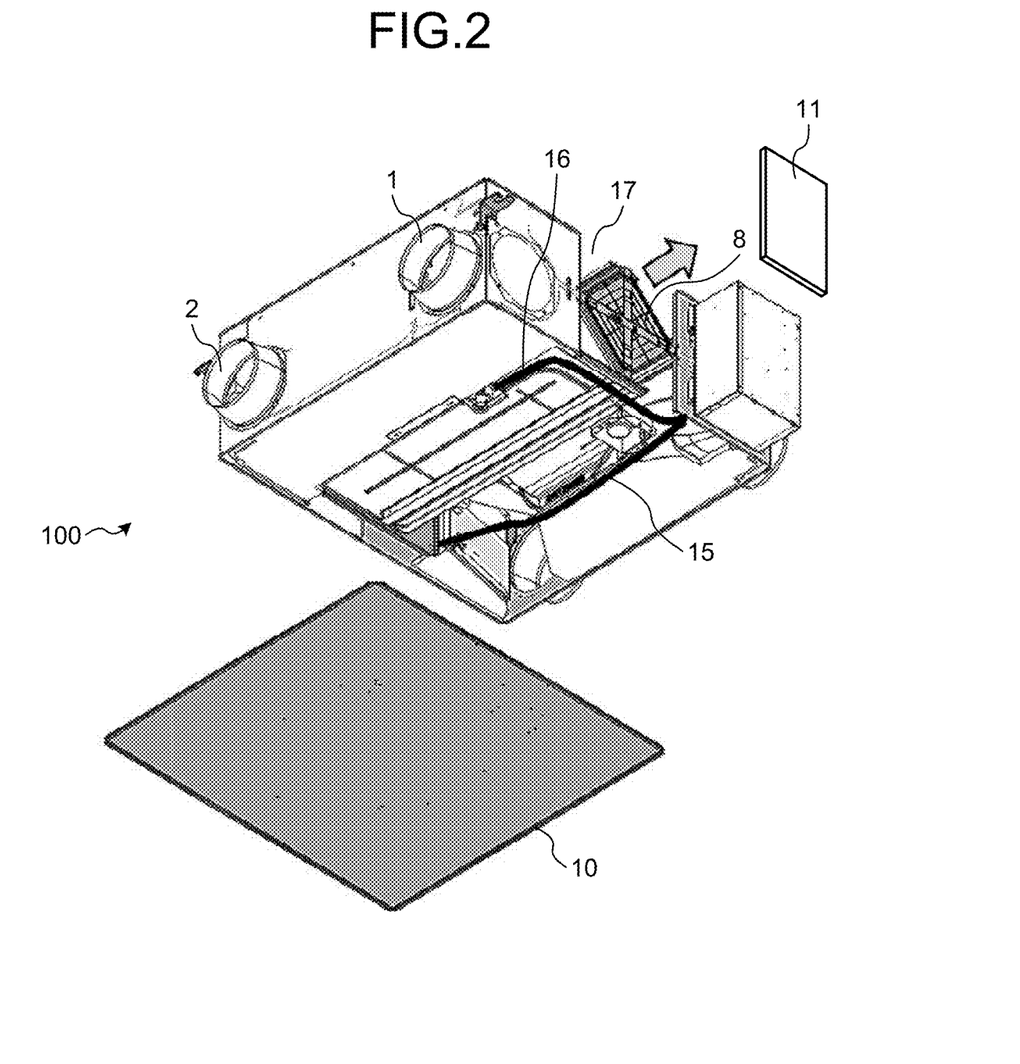
FIG. 2 is an exploded perspective view of the heat exchange ventilator according to the first embodiment.
Figure 3:
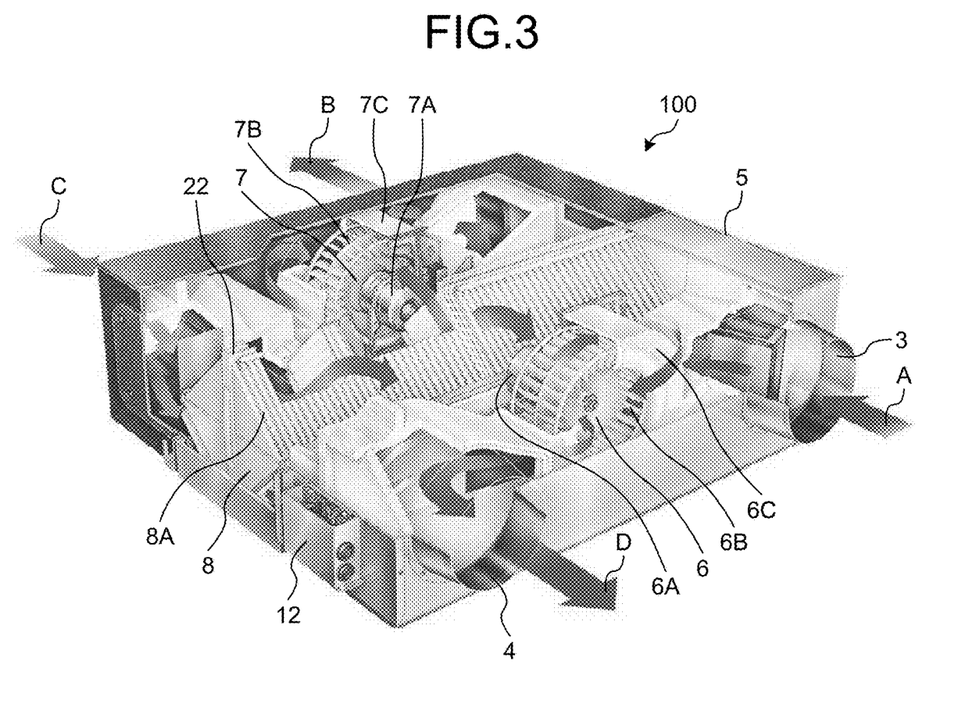
FIG. 3 illustrates air flows inside the heat exchange ventilator according to the first embodiment.

FIGS. 1 and 2 are exploded perspective views of the heat exchange ventilator according to the first embodiment of the present invention. FIG. 3 illustrates air flows inside the heat exchange ventilator according to the first embodiment. The heat exchange ventilator 100 according to the first embodiment is mounted in a roof space and ventilates a room interior by supplying and expelling air through ducts (not illustrated).

An exterior casing 5 is formed to be a hexahedral box including a top plate 9, a base plate 10, and four side plates. The exterior casing 5 is internally formed with a supply air passage 5A and an exhaust air passage 5B. An air supply blower 6 is mounted in the supply air passage 5A. The supply air passage 5A lets through a supply air flow that is directed from outside a room toward the room interior by operation of the air supply blower 6. Structure of the air supply blower 6 is such that an electric motor 6A and a vane member 6B that rotates as the electric motor 6A is driven are surrounded by an air supply fan casing 6C that is formed to be spiral.

An air exhaust blower 7 is provided in the exhaust air passage 58B. The exhaust air passage 5B lets an exhaust air flow through that is directed from the room interior toward the outside of the room by operation of the air exhaust blower 7. Structure of the air exhaust blower 7 is such that an electric motor 7A and a vane member 7B that rotates as the electric motor 7A is driven are surrounded by an air exhaust fan casing 7C that is formed to be spiral.

A heat exchanger 8 is installed and accommodated in the exterior casing 5, at the middle of the supply air passage 5A and the middle of the exhaust air passage 5B. The heat exchanger 8 includes a heat exchange element 8A of quadrangular-prism shape and heat exchanger frames 22 each of which is mounted to each of four corners of the heat exchange element 8A. The heat exchanger 8 causes heat exchange between the supply air flow that passes through the supply air passage 5A and the exhaust air flow that passes through the exhaust air passage 58. The heat exchange element 8A is of quadrangular-prism shape, having, in stacked relationship, a plurality of supply air passageways each being a multilayer structure formed by bonding of a corrugated board to a flat board and a plurality of exhaust air passageways each being a multilayer structure formed by bonding of a corrugated board to a flat board with the supply air passageways being orthogonal in direction to the exhaust air passageways. The heat exchange element 8A causes heat exchange between supply air that passes through the supply air passageways and exhaust air that passes through the exhaust air passageways.

An outside-air inlet 1 and an exhaust air outlet 2 are provided at one side of the exterior casing 5. A return air inlet 3 and a supply air outlet 4 are provided at another side of the exterior-casing 5 that is opposite to the side provided with the outside-air inlet 1 and the exhaust air outlet 2.

The supply air passage 5A leads from the outside-air inlet 1 to the supply air outlet 4 via the supply air passageways of the heat exchanger 8 and the air supply fan casing 6C. The exhaust air passage 5B leads from the return air inlet 3 to the exhaust air outlet 2 via the exhaust air passageways of the heat exchanger 8 and the air exhaust fan casing 7C. The supply air passage 5A and the exhaust air passage 5B are made independently of each other to prevent the supply air and the exhaust air from being mixed in the heat exchange ventilator 100.

The power supply box 12 is provided on a side of the exterior casing 5 on which a maintenance cover 11 is provided, and the power supply box 12 is rather provided close to the air supply blower 6. A lead wire 13 connects the electric motor 6A of the air supply blower 6 and the power supply box 12. The power supply box 12 supplies power to the electric motor 6A of the air supply blower 6 via the lead wire 13. The lead wire 13 is routed between the heat exchanger 8 and the air supply blower 6 inside the exterior casing 5.

A lead wire 14 connects the electric motor 7A of the air exhaust blower 7 and the power supply box 12. The power supply box 12 supplies power to the electric motor 7A of the air exhaust blower 7 via the lead wire 14. The lead wire 14 is routed from the air exhaust blower 7 over the heat exchanger 8 to the power supply box 12.

A sensor 15 and a sensor 16 are connected to the power supply box 12. The power supply box 12 supplies power and signals to the sensors 15 and 16. A wire of the sensor 16 is connected over the heat exchanger 8 to the power supply box 12. The sensor 15 is mounted at the upstream side of the heat exchanger 8 regarding the exhaust air passage 5B to detect temperature and humidity of return air A coming from the room interior. The sensor 16 is mounted at the upstream side of the heat exchanger 8 regarding the supply air passage 5A to detect temperature and humidity of outside air C. Each of the electric motors 6A and 7A is controlled based on room-interior temperature and humidity information obtained by the sensor 15 and outside-air temperature and humidity information obtained by the sensor 16.

As the air exhaust blower 7 is operated, the room-interior return air A is drawn through the duct and the return air inlet 3 into the exhaust air passage 5B as illustrated in FIG. 3. The return air A drawn into the exhaust air passage 5B passes through the exhaust air passageways of the heat exchanger 8 and is then expelled from the exhaust air outlet 2 through the duct into the outside of the room, thus becoming the exhaust air B.

As the air supply blower 6 is operated, the air C that is on the outside of the room is drawn through the duct and the outside-air inlet 1 into the supply air passage 5A. The outside air C drawn into the supply air passage 5A passes through the supply air passageways of the heat exchanger 8 and is then expelled from the supply air outlet 4 through the duct into the room interior, thus becoming the supply air D. The heat exchange ventilator 100 recovers exhaust heat by means of the heat exchange that takes place at the heat exchanger 8 between the supply air flow and the exhaust air flow and sends the exhaust heat into the room interior along with the supply air flow. In this way, a cooling and heating load for the room interior can be reduced.

Figure 4:
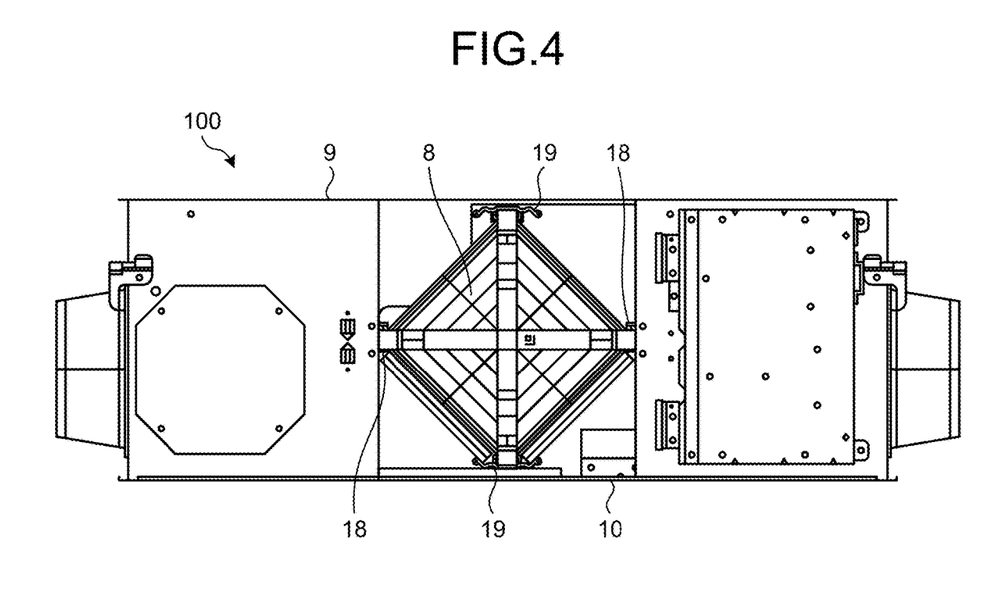
FIG. 4 illustrates respective positions of guide rails for the heat exchanger in the heat exchange ventilator according to the first embodiment.

FIG. 4 illustrates respective positions of guide rails for the heat exchanger in the heat exchange ventilator according to the first embodiment. The outwardly extending heat exchanger frame 22 is mounted to each of vertices that are the square corners of the heat exchanger 8. Each heat exchanger frame 22 extends from one end to the other end of the heat exchanger 8 along a stacking direction of the heat exchanger 8. The guide rails 18 and 19 are provided on the heat exchanger 8's left, right, top, and bottom inside the exterior casing 5. The heat exchanger 8 is being installed in the exterior casing 5 with the heat exchanger frames 22 correspondingly engaging in the left and right guide rails 18 and the upper and lower guide rails 19. The heat exchanger 8 is horizontally detached from and attached to the exterior casing 5 along the left and right guide rails 18 and the upper and lower guide rails 19. The maintenance cover 11 is provided, at a side of the exterior casing 5, to face an end face of the heat exchanger 8. The heat exchanger 8 can be inserted or removed from an opening 17 in the exterior casing 5 when the maintenance cover 11 is opened.

Figure 5:
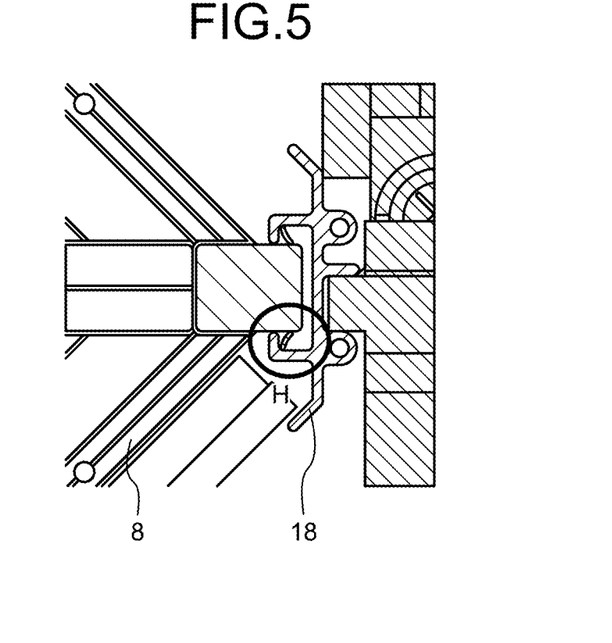
FIG. 5 is a front view of the right guide rail of the heat exchange ventilator according to the first embodiment.
Figure 6:
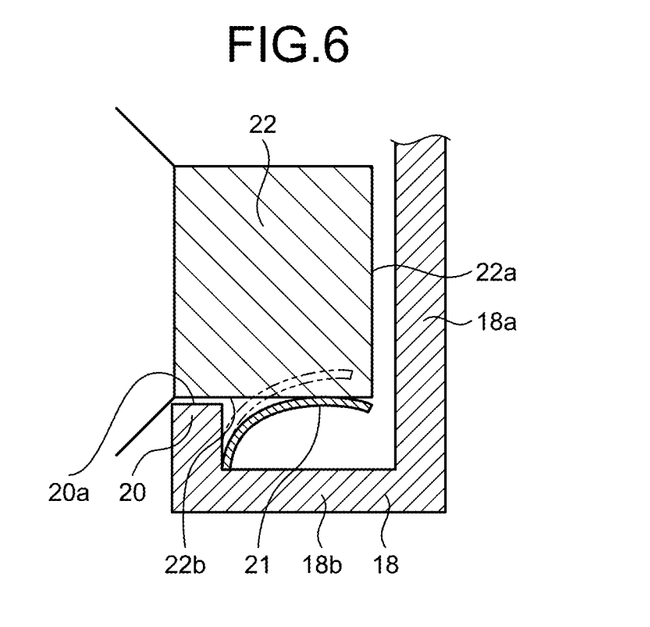
FIG. 6 is a schematic view of a contact part between the right guide rail and the heat exchanger in the heat exchange ventilator according to the first embodiment.
Figure 7:
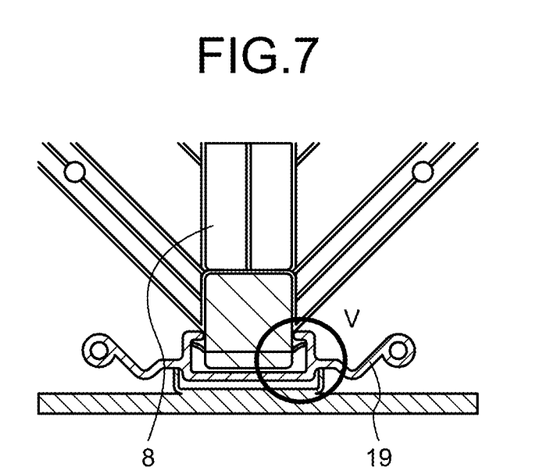
FIG. 7 is a front view of the lower guide rail of the heat exchange ventilator according to the first embodiment.
Figure 8:
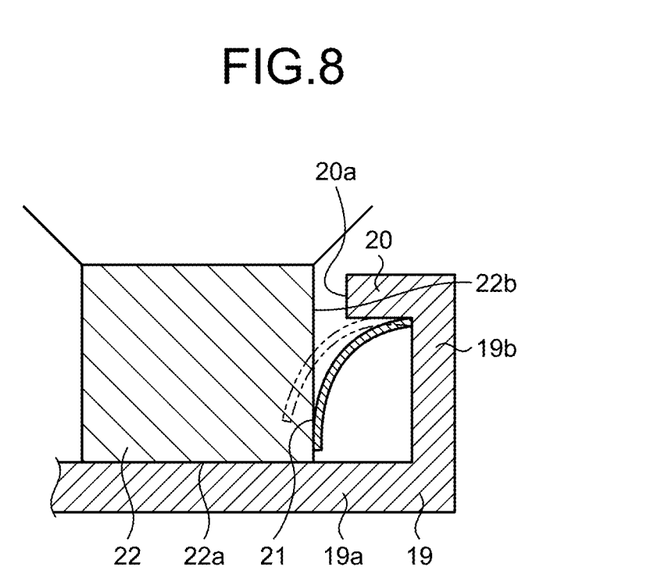
FIG. 8 is a schematic view of a contact part between the lower guide rail and the heat exchanger in the heat exchange ventilator according to the first embodiment.

FIG. 5 is a front view of the right guide rail of the heat exchange ventilator according to the first embodiment. FIG. 6 is a schematic view of a contact part between the right guide rail and the heat exchanger in the heat exchange ventilator according to the first embodiment. FIG. 6 is a schematic, enlarged illustration of part H illustrated in FIG. 5. FIG. 7 is a front view of the lower guide rail of the heat exchange ventilator according to the first embodiment. FIG. 8 is a schematic view of a contact part between the lower guide rail and the heat exchanger in the heat exchange ventilator according to the first embodiment. FIG. 8 is a schematic, enlarged illustration of part V illustrated in FIG. 7. As illustrated in FIGS. 5 to 8, the guide rail 18 and the guide rail 19 each include holding parts 20 that hold the heat exchanger 8.

Each guide rail 18 includes an end-face-facing part 18a, a pair of side-facing parts 18b, and rib-shaped holding parts 20. The end-face-facing part 18a extends vertically while facing an end face 22a of the heat exchanger frame 22. The pair of side-facing parts 18b each correspondingly connect with an upper or a lower part of the end-face-facing part 18a, extend parallel to sides 22b of the heat exchanger frame 22, and a clearance is provided between each of the side-facing parts 18b and the corresponding side 22b. Each of the rib-shaped holding parts 20 connects with corresponding one of the side-facing parts 18b while being spaced apart from the end-face-facing part 18a. The holding parts 20 correspondingly project from the upper and lower side-facing parts 18b, and face to each other. The guide rail 19 includes an end-face-facing part 19a that extends horizontally while facing an end face 22a of the heat exchanger frame 22, a pair of side-facing parts 19b that connect with a left and a right part of the end-face-facing part 19a and extend parallel to sides 22b of the heat exchanger frame 22, and rib-shaped holding parts 20 that connect with corresponding one of the side-facing parts 19b while being spaced apart from the end-face-facing part 19a. These holding parts 20 correspondingly project from the left and right side-facing parts 19b, and face to each other. In other words, each of the holding parts 20 projects from the side-facing part 18b or 19b toward the heat exchanger frame 22.

Each of the holding parts 20 of the guide rails 18 and 19 are formed to be rib-shaped and thus can have a small area of contact with the heat exchanger frame 22. Therefore, decreased frictional resistance can be achieved when the heat exchanger 8 is detached and attached for maintenance. If a contact part between the holding part 20 and the heat exchanger frame 22 is equivalent to thickness of a resin, the contact can substantially be made as a line contact.

A seal member 21 is provided integrally with the guide rail 18 in the clearance between the side-facing part 18b and the heat exchanger frame 22, and a seal member 21 is provided integrally with the guide rail 19 in a clearance between the side-facing part 19b and the heat exchanger frame 22. Each of the seal members 21 is brought into contact with the heat exchanger frame 22 of the heat exchanger 8 and is pressed against the heat exchanger frame 22 by means of its elasticity that is caused by bending of the seal member 21. Thus, sealing property is ensured between the heat exchanger 8 and the guide rail 18 as well as between the heat exchanger 8 and the guide rail 19. The seal member 21 that has not been elastically deformed is indicated by a two-dot chain line in FIGS. 6 and 8. The seal members 21 are made of, for example, an elastomer.

The seal member 21 is provided in the clearance between the side-facing part 18b and the heat exchanger frame 22 as well as in the clearance between the side-facing part 19b and the heat exchanger frame 22. Each of the seal members 21 is formed to be of curved-plate shape and is elastically deformable. Each of the seal members 21 has one end fixed to the guide rail 18 or 19, and the opposite end as a free end. Each of the seal members 21 is fixed to the side-facing part 18b or 19b and abuts against the heat exchanger frame 22 at its curved surface, thus providing a seal.

Because each of the holding parts 20 projects from the side-facing part 18b or 19b, it is possible to keep the clearance between the side-facing part 18b and the heat exchanger frame 22 and the clearance between the side-facing part 19b and the heat exchanger frame 22 to be a certain amount or more when a leading end 20a of the holding parts 20 and the heat exchanger frame 22 of the heat exchanger 8 come into contact with each other. Therefore, the deformation of the seal member 21 can be kept within a certain amount, and the seal member 21 can stably abut against the heat exchanger frame 22, so that the sealing property that can be ensured is stable. Because the deformation of the seal member 21 can be kept within the certain amount, contact pressure between the seal member 21 and the heat exchanger frame 22 can be maintained within a certain value, and frictional resistance can accordingly be decreased, thus achieving improved property for attaching and detaching of the heat exchanger 8. Because the heat exchanger 8 can be supported by the holding parts 20, weight of the heat exchanger 8 is not applied to the seal members 21 when the heat exchanger 8 is attached or detached. Therefore, damage to the seal member 21 can be lessened when the heat exchanger 8 is attached or detached, and improved sliding can also be achieved for the heat exchanger 8 during the attaching or the detaching.

In cases where a conventional packing that uses an expanded foam material as a material is compressed, its opposing force decreases over a long period of time, and resilience disappears. For this reason, there is a possibility of deteriorated sealing property of a gap between a heat exchanger and a rail when the heat exchanger is remounted after removal. In the first embodiment, however, the material is bent only within its elastic range of deformation and thus has long-lasting elasticity, and additionally, its sealing performance can have improved long-term reliability. It is to be noted that the other end of the seal member 21 is the free end in the example of the first embodiment but is not limited to this. For example, the other end of each of the seal members 21 may be fixed to the end-face-facing part 18a or 19a to have a hollow part in section.

If each of the seal members 21 according to the first embodiment is formed integrally with the guide rail 18 or 19 by two-color molding, a packing made of an expanded foam material does not need to be affixed. Thus, cost of the packing material can be suppressed. The seal member 21 and each of the guide rails 18 and 19 can be formed integrally with each other by extrusion molding when, for example, the elastomer is used for the seal member 21 and polypropylene that is a curing resin or acrylonitrile butadiene styrene is used for the guide rails 18 and 19. It is to be noted that each of the seal members 21 may be formed as a member separate from the guide rail 18 or 19 and may be combined with the guide rail 18 or 19.

Using the resin for the seal member 21 and ensuring the sealing property without completely crushing the seal member 21 can reduce aging degradation of the seal member 21 that might be caused by shaving of the seal member 21 in association with sliding of the heat exchanger 8 for maintenance, and thus can reduce sealing performance deterioration.

Figure 9:
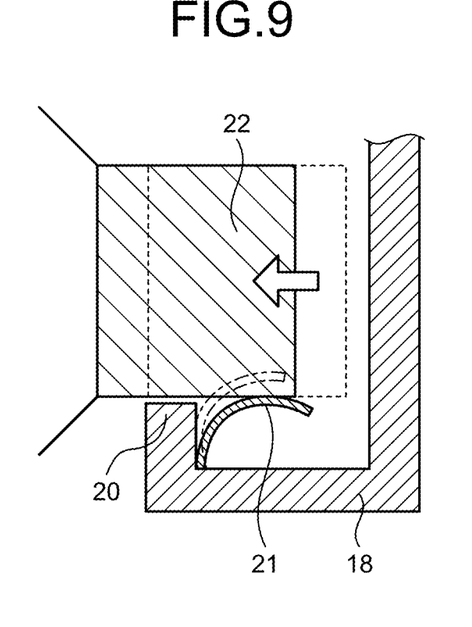
FIG. 9 is a schematic view of the contact part between the right guide rail and the heat exchanger in a case where the heat exchanger has contracted in the heat exchange ventilator according to the first embodiment.

FIG. 9 is a schematic view of the contact part between the right guide rail and the heat exchanger in a case where the heat exchanger has contracted in the heat exchange ventilator according to the first embodiment. When the heat exchanger 8 contracts due to aging degradation, the position of the heat exchanger frame 22 may shift. The heat exchanger 8 not experiencing contraction is indicated by a broken line in FIG. 9. In FIG. 9, the seal member 21 not experiencing elastic deformation is indicated by a two-dot chain line. The seal member 21 is provided so as to come into contact with the heat exchanger frame 22 in parallel with a direction in which the heat exchanger frame 22 shifts due to the contraction of the heat exchanger 8. Accordingly, even after the heat exchanger frame 22 shifts due to the contraction of the heat exchanger 8, the sealing property is maintained.

The heat exchanger 8 of the heat exchange ventilator 100 according to the first embodiment is held by the holding parts 20 of the guide rails 18 and 19, so that an allowance for contact between the heat exchanger frame 22 and each of the seal members 21 of the guide rail 18 and 19 is adjustable. The contact part between the heat exchanger frame 22 and each of the guide rails 18 and 19 is minimized, so that the contact parts around the heat exchanger 8 can have reduced contact pressure with respect to directions in which the heat exchanger 8 is removed and inserted for maintenance, thereby decreased frictional resistance can be achieved. Therefore, the heat exchanger 8 can be removed and inserted smoothly, and with air leaks between the supply air passage 5A and the exhaust air passage 5B during installation of the heat exchanger 8 minimized, the maintenance can be simplified.

Because the air leaks between the supply air passage 5A and the exhaust air passage 5B during installation of the heat exchanger 8 are reduced, the heat exchange ventilator 100 according to the first embodiment can achieve improved ventilation efficiency.

Integrally molding each of the guide rails 18 and 19 and the seal member 21 by the two-color molding, can decrease an amount to use for the seal members 21 and thus can bring about resource saving.

Carrying out the two-color molding for the seal member 21 can reduce, as compared with the expanded foam material packing, decrease in sealing property which might be deteriorated over time as the packing is shaved when the heat exchanger 8 is slid.

Second Embodiment

Figure 10:
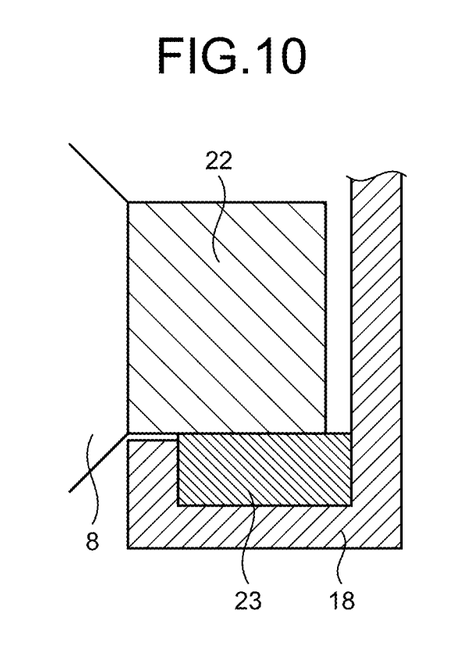
FIG. 10 is a schematic view of a contact part between a right guide rail and a heat exchanger in a heat exchange ventilator according to a second embodiment.
Figure 11:
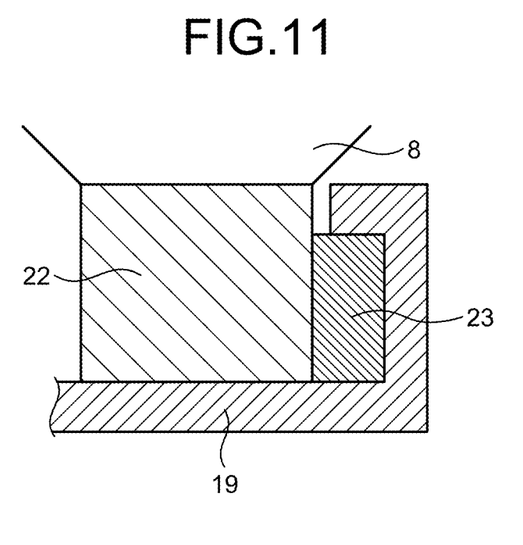
FIG. 11 is a schematic view of a contact part between a lower guide rail and the heat exchanger in the heat exchange ventilator according to the second embodiment.

FIG. 10 is a schematic view of a contact part between the right guide rail and the heat exchanger in the heat exchange ventilator according to the second embodiment. FIG. 11 is a schematic view of a contact part between the lower guide rail and the heat exchanger in the heat exchange ventilator according to the second embodiment. The heat exchange ventilator 100 according to the second embodiment is similar in overall structure to the heat exchange ventilator 100 according to the first embodiment. A seal member 23 is affixed to each of the guide rails 18 and 19 of the heat exchange ventilator 100 according to the second embodiment. The seal member 23 is a packing made of an expanded foam material. It is to be noted that the seal member 23 may be affixed to the heat exchanger frame 22. The seal member 23 has only to be capable of providing a seal at least between the heat exchanger frame 22 and the guide rail 18 or 19 and may be changed appropriately.

The guide rails 18 and 19 of the heat exchange ventilator 100 according to the second embodiment each include the holding parts 20 projecting from the side-facing parts 18b or 19b, so that a clearance equivalent to a projecting amount of the holding part 20 is secured between each of the side-facing parts 18b and 19b and the heat exchanger frame 22. During attaching or detaching of the heat exchanger 8, reduced friction can therefore be achieved with the seal member 23 not being completely crushed by the heat exchanger frame 22, so that sealing deterioration that might be caused by attaching and detaching of the heat exchanger 8 can be suppressed between the heat exchanger 8 and each of the guide rails 18 and 19.

The above structures illustrated in the embodiments are examples of content of the present invention, can be combined with other techniques that are publicly known and can be partly omitted or changed without departing from the gist of the present invention.

REFERENCE SIGNS LIST 1 outside-air inlet; 2 exhaust air outlet; 3 return air inlet; 4 supply air outlet; 5 exterior casing; 5A supply air passage; 5B exhaust air passage; 6 air supply blower; 6A, 7A electric motor; 6B, 7B vane member; 6C air supply fan casing; 7 air exhaust blower; 7C air exhaust fan casing; 8 heat exchanger; 8A heat exchange element; 9 top plate; 10 base plate; 11 maintenance cover; 12 power supply box; 13, 14 lead wire; 15, 16 sensor; 17 opening; 18, 19 guide rail; 18a, 19a end-face-facing part; 18b, 19b side-facing part; 20 holding part; 21, 23 seal member; 22 heat exchanger frame; 100 heat exchange ventilator.

The invention claimed is:

1. A heat exchange ventilator including an exterior casing including a supply air passage that lets a supply air flow through and an exhaust air passage that lets an exhaust air flow through, and a heat exchanger mounted between the supply air passage and the exhaust air passage to perform heat exchange between the supply air flow and the exhaust air flow, the heat exchanger including a heat exchange element of quadrangular-prism shape and heat exchanger frames each of which is mounted to each of four corners of the heat exchange element and is outwardly extended, the heat exchange ventilator comprising:

a plurality of guide rails mounted inside the exterior casing and engaging the heat exchanger frame to guide the heat exchanger that is attached to and detached from the exterior casing, wherein each of the guide rails includes: an end-face-facing part facing an end face of corresponding one of the heat exchanger frames; a side-facing part providing a clearance between a side of the heat exchanger frame and the side-facing part; a holding part projecting from the side-facing part toward the heat exchanger frame; and a seal member provided in the clearance and sealing a gap between the heat exchanger frame and the guide rail wherein a leading end of the holding part abuts the side of the corresponding one of the heat exchanger frames.

2. The heat exchange ventilator according to claim 1, wherein the guide rails engage the heat exchanger frames at a top and a bottom, or at a left and a right of the heat exchanger.

3. The heat exchange ventilator according to claim 2, wherein the seal member is made of an elastomer.

4. The heat exchange ventilator according to claim 2, wherein the seal member is made of an expanded foam material.

5. The heat exchange ventilator according to claim 1, wherein an amount by which the seal member projects from the side-facing part is larger than an amount by which the holding part projects from the side-facing part.

6. The heat exchange ventilator according to claim 5, wherein the seal member is made of an elastomer.

7. The heat exchange ventilator according to claim 5, wherein the seal member is made of an expanded foam material.

8. The heat exchange ventilator according to claim 1, wherein the seal member has a curved-plate shape, at least one end of the seal member is fixed to the guide rail, another end of the seal member is a free end and a curved surface of the seal member abuts against the heat exchanger frame.

9. The heat exchange ventilator according to claim 8, wherein the seal member is made of an elastomer.

10. The heat exchange ventilator according to claim 8, wherein the seal member is made of an expanded foam material.

11. The heat exchange ventilator according to claim 1, wherein the seal member is made of an elastomer.

12. The heat exchange ventilator according to claim 11, wherein the seal member and the guide rail are integral with each other.

13. The heat exchange ventilator according to claim 1, wherein the seal member is made of an expanded foam material.

* * * * *